Oct. 8, 1935.    J. H. THOMAS    2,016,401
CAKED GLASS WOOL AND ITS MANUFACTURE
Original Filed March 6, 1933    2 Sheets-Sheet 1
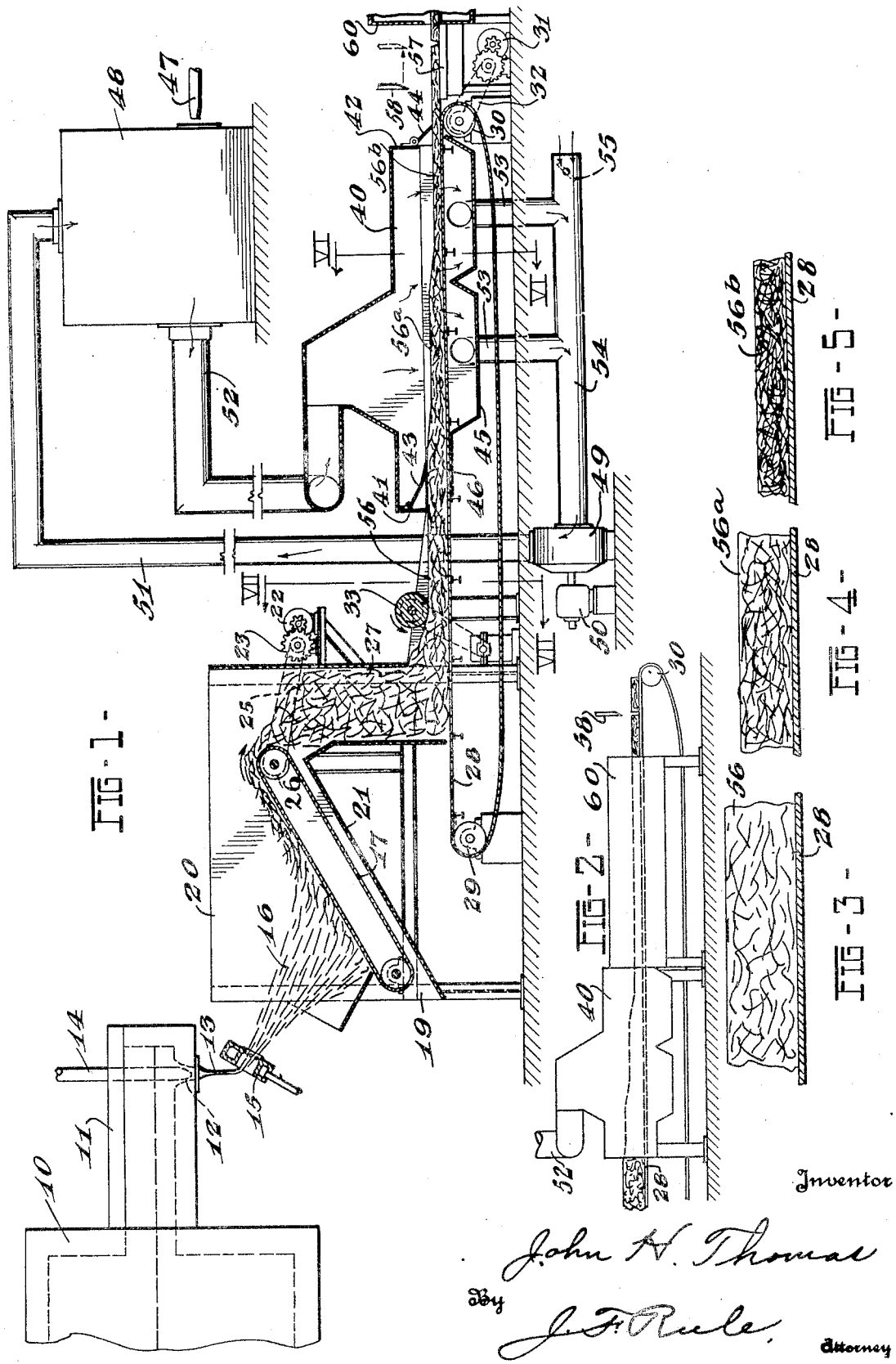

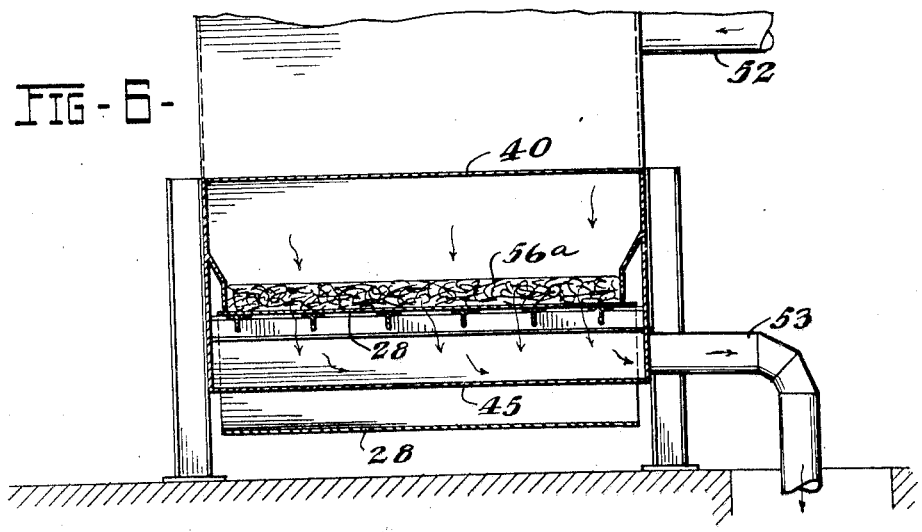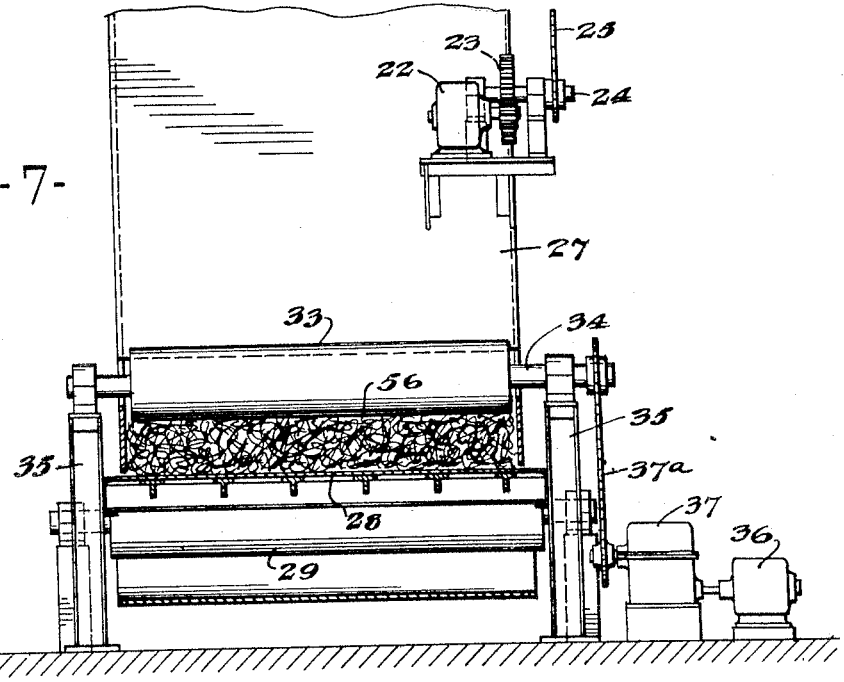

Patented Oct. 8, 1935

2,016,401

UNITED STATES PATENT OFFICE 2,016,401

CAKED GLASS WOOL AND ITS MANUFACTURE

John H. Thomas, Newark, Ohio, assignor to Owens-Illinois Glass Company, a corporation of Ohio Application March 6, 1933, Serial No. 659,825
Renewed February 27, 1935

9 Claims. (Cl. 49—1)

My invention relates to glass wool and to a method and apparatus by which the wool is heated and softened to produce partial fusion, whereby the individual fibers thereof are caused to adhere or fuse together and settle, resulting in a compact mass of greater or less density and which retains its shape without the use of a binder.

Heretofore it has been proposed to treat glass wool with various materials other than glass to serve as a binder for causing the individual threads or filaments comprising the wool to adhere to each other, whereby the wool may be caused to retain a more or less permanent and definite shape when formed into wool bats or other articles of predetermined shape.

An object of the present invention is to provide a novel method and means for caking the wool and giving the mass a definite or permanent shape without the use of a separate binder.

A further object of the invention is to provide a novel method and apparatus by which the mass of wool may be fused together and given any desired density and also given a rigidity and strength determined by its density.

Other objects of the invention will appear hereinafter.

In the accompanying drawings:

Figure 1 is a sectional elevation of an apparatus for manufacturing and caking glass wool in accordance with the principles of my invention.

Fig. 2 is a somewhat diagrammatic view showing a leer in combination with the heating chamber.

Figs. 3, 4, and 5 are fragmentary views showing a section of the wool blanket at successive stages during the caking process.

Fig. 6 is a sectional elevation at the line VI—VI on Fig. 1.

Fig. 7 is a sectional elevation at the line VII—VII on Fig. 1.

Figs. 8 and 9 are fragmentary views showing different forms of belt conveyors.

Referring particularly to Figure 1, molten glass is supplied from a furnace 10 having a forehearth 11 provided with a bottom outlet 12 from which the glass flows in a continuous stream 13, the size of which is regulated and controlled by an adjustable plug 14. The glass is directed through a blower 15 which may be of conventional form. Steam or other gas is supplied to the blower and impinges with force on the stream 13, thereby reducing it to fine threads or filaments of glass wool 16. These accumulate on an endless inclined conveyor 17 mounted in a supporting structure 19 which includes vertical confining walls 20 on opposite sides of the conveyor, and a floor 21 beneath the conveyor. An electric motor 22 (see also Fig. 7) is connected through gearing 23 to a drive shaft 24 which drives a belt 25, the latter transmitting motion to the upper roll 26 over which the belt conveyor 17 is trained. The conveyor 17 is thus driven continuously and carries the wool upward and discharges it into a vertical chute 27.

Beneath the chute 27 runs a horizontal endless belt conveyor 28 which is trained over rolls 29 and 30. The conveyor 28 is driven by a motor 31 having driving connections 32 with the roll 30.

The glass wool is carried downward by gravity through the chute 27 and deposited on the traveling conveyor 28 thereheneath and carried forward on the conveyor. As the wool passes beyond the chute, it passes beneath a pressure roll 33 (see also Fig. 7). This roll is mounted on a shaft 34 journaled in bearings at the upper ends of standards 35. The roll may be driven by an electric motor 36 having driving connection through a gear box 37 and belt 37a with the shaft 34. The roll 33 serves to compress and compact the wool to a certain extent, so that a blanket of wool of predetermined thickness and density is laid on the conveyor 28.

The blanket of wool may be cut into individual units or bats of any desired size and shape, and in accordance with the present invention these are subjected to heat sufficient to soften the glass and cause the individual fibers or threads to adhere to each other. This heat treatment produces a caked mass of greater or less density, depending on the intensity of the heat and the length of time it is applied. The heating and caking process may be carried on in an oven which may be heated, for example, by means of electric heating units mounted on the inside wall thereof.

The preferred method of heating and caking the glass, as herein illustrated, consists in providing a heating chamber or oven 40 through which the conveyor 28 travels and through which the wool is carried on the conveyor and thereby caked by a continuous process. The end walls 41 and 42 are spaced above the conveyor to provide a passageway for the entrance and exit of the wool. Aprons 43 and 44 are hinged, respectively, to the end walls 41 and 42 and bear at their free ends on the traveling wool to prevent excessive leakage of air from the oven. The oven comprises a floor 45 spaced below the conveyor 28, said floor having an end extension 46 forming a support for the traveling conveyor.

Heat is supplied by means of a burner or burners 47 which are arranged to direct their flames into a furnace 48 which may comprise checkerwork of refractory material of usual construction by which the air which circulates through the furnace is heated. A circulation of the hot air is maintained by a blower 49 driven by a motor 50. The air is forced by the blower through a pipe 51 to the furnace 48 and heated in its passage through the furnace. The hot air is conducted from the furnace through a pipe 52 to the heating chamber 40. The belt 28 consists of openwork permitting the passage of air therethrough. The hot air entering the heat chamber 40 is drawn through the blanket of glass and through the openwork belt 28 into the section of the heating chamber beneath the belt. From thence it is drawn through exhaust pipes 53 and a return pipe 54 to the blower 49, thus completing the circulation of the air in a closed circuit. The free end of the return pipe 54 may be open and provided with a damper 55 by which a regulated amount of outside air may be introduced into the circulating system, thus controlling the temperature and the rate at which the heated air is drawn through the glass wool in its passage through the heat chamber 40.

The blanket of wool 56 at the time it enters the heat chamber is in a more or less matted or felted condition with the wool fibers interwoven to a certain extent so that the mass tends to retain a definite shape but is easily separated. As the wool travels through the heat chamber it is heated and thereby brought too a more or less softened, plastic condition. This causes a gradual settling of the mass to a more compact and dense form. At the same time the softening of the glass causes the individual fibers to fuse together or adhere to each other to a certain extent.

Figure 3 represents a portion of the wool blanket in its loose fluffy condition at the time it enters the heat chamber. Figure 4 shows the wool 56ª at an intermediate point during its passage through the heat chamber, the wool at this stage being softened so that it has settled and caked to a certain extent. It has become caked sufficiently to retain its shape if cooled at this stage of the process. Figure 5 represents the wool 56ᵇ at a more advanced stage. The wool at this stage has been further softened and settled into a comparatively compact mass with the individual fibers fused together so that upon cooling it forms a comparatively dense, rigid mass which will retain its shape and integrity under considerable stress or pressure.

It will be understood that the extent of the heat treatment and the degree to which the glass is softened, condensed and fused during the process may be varied to any desired extent within wide limits by varying the intensity of the heat applied thereto within the heat chamber and by varying the length of time the wool is retained within the heat chamber.

The extent to which it is desirable to condense and cake the wool by the above described heating method is determined largely by the particular use to which the product is to be put. It will be understood that this caked wool is adapted for a wide variety of uses, as, for example, refrigerator insulation, acoustical materials, insulating board, stove insulation and numerous other uses. For some of these uses a comparatively slight caking is sufficient, whereas for other purposes a much more dense and rigid material is desirable and is obtained by a more extended application of the caking process.

The blanket of caked wool as it emerges from the oven 40 may be received on a cutting table 57 and cut into individual pieces or bats by means of a cutter 58. This cutter may be operated by any suitable mechanism operating in synchronism with the movement of the conveyor 28 so that the cutter descends and severs the glass and also advances with the glass to the dotted line position (Fig. 1) and is then lifted and returned for a succeeding operation.

If desired, an annealing leer 60 may be provided into which the caked wool is introduced and annealed either before or after it is cut into individual pieces. As shown in Fig. 2, the leer 60 is located in line with the heat chamber 40 and forms in effect a continuation thereof. The conveyor 28 in this form of construction is extended through the leer so that the blanket of wool is heated and caked in the chamber 40 and passes into the leer before it has cooled and is thereby annealed, all by a continuous process. The cutter 58 is in this instance located beyond the discharge end of the leer.

Figure 8 shows a modification of the belt conveyor 28 comprising a series of slats 28ª spaced apart to permit the heated air to pass through the wool and through the conveyor.

Figure 9 shows a further modification in which the conveyor 28ᵇ comprises an open mesh wire fabric or screen permitting a free passage of air therethrough.

Modifications may be resorted to within the spirit and scope of my invention.

What I claim is:

1. The method which comprises subjecting glass wool to a temperature at which the wool is softened and the individual fibers thereof thereby caused to adhere to each other, and compacting the softened wool and reducing its volume by a continued application of heat thereto.

2. The method which comprises subjecting wool consisting of fine fibers of refractory material in a loose mass to a heat sufficient to soften the material and cause a partial fusion or welding of the individual fibers together in the form of a fibrous mass, causing a compacting and reduction in volume of said mass by a continued application of heat thereto, and then cooling said material and thereby producing a caked fibrous mass.

3. The method which comprises reducing molten refractory material to fine fibers or filaments, accumulating said filaments in a loosely matted form, applying heat to the matted material of sufficient intensity and for a sufficient length of time to soften the material and cause a welding or fusion of the individual fibers by which the mass is caked, the thickness of the mat reduced and its density increased, and then cooling the material.

4. The method which comprises producing a stream of molten refractory material, blowing said stream into fine threads or filaments, accumulating and matting said filaments into a loose mat, applying heat to said mat sufficient to soften the material and thereby causing it to settle by gravity into a much more dense compact fibrous condition, and then cooling the material.

5. The combination of a heat chamber, a furnace, a blower, pipe connections between said furnace, heat chamber and blower through which a circulation of hot gas is maintained from the furnace to the heat chamber, through the heat chamber, from the heat chamber to the blower, and from the blower back to the furnace, and means for introducing glass wool into said heat chamber and causing the heated gas to be drawn therethrough.

6. The combination of a heat chamber, a furnace, a blower, pipe connections between said furnace, heat chamber and blower through which a circulation of hot gas is maintained from the furnace to the heat chamber, through the heat chamber, from the heat chamber to the blower, and from the blower back to the furnace, an endless conveyor extending through said heat chamber, means for laying a blanket of glass wool on said conveyor and causing it to be carried by the conveyor through the heat chamber and through the path of movement of the hot gas through said chamber, thereby causing the hot gas passing through said chamber to be drawn through said wool, and means for maintaining said gas at a temperature which will cause softening and partial fusion of the wool during its passage through said chamber.

7. The combination of a heat chamber, a furnace, a blower, pipe connections between said furnace, heat chamber and blower through which a circulation of hot gas is maintained from the furnace to the heat chamber, through the heat chamber, from the heat chamber to the blower, and from the blower back to the furnace, an endless conveyor extending through said heat chamber, means for laying a blanket of glass wool on said conveyor and causing it to be carried by the conveyor through the heat chamber and through the path of movement of the hot gas through said chamber, thereby causing the hot gas passing through said chamber to be drawn through said wool, means for maintaining said gas at a temperature which will cause softening and partial fusion of the wool during its passage through said chamber, and an annealing oven adjoining said heat chamber, said conveyor extending through the annealing oven and arranged to carry the wool through the annealing oven after its passage through the heat chamber.

8. The method which comprises drawing a refractory material while in a molten or plastic condition into fine threads or filaments, accumulating and matting said filaments into a loose mat, applying to said mat while the interstitial spaces are open and free from foreign material, heat sufficient to soften the fibers and cause them to weld together, and compacting the mass while the fibers are thus softened into a substantially more dense and compact but porous or fibrous conditions.

9. The method which comprises drawing a refractory material while in a molten or plastic condition into fine threads or filaments, accumulating and matting said filaments into a loose mat, applying to said mat while the interstitial spaces are open and free from foreign material, heat sufficient to soften the fibers and cause them to weld together, and causing the fibers while softened to settle by gravity into a more dense compact mass of reduced volume.

JOHN H. THOMAS.